United States Patent
Murphree

[11] 3,789,128
[45] Jan. 29, 1974

[54] MULTIPATH SONAR SIMULATOR
[75] Inventor: Francis J. Murphree, Winter Park, Fla.
[73] Assignee: The United States of America as represented by the Secretary of the Navy, Washington, D.C.
[22] Filed: Feb. 22, 1971
[21] Appl. No.: 117,585

[52] U.S. Cl. .............................................. 35/10.4
[51] Int. Cl. ........................................... G09b 9/00
[58] Field of Search ...................... 35/10.4; 340/5 D

[56] References Cited
UNITED STATES PATENTS
3,555,165  1/1971   Ettenhofer ........................... 35/10.4
3,484,738  12/1969  Autrey ................................ 35/10.4
3,363,045  1/1968   Pommerening ..................... 35/10.4

Primary Examiner—Maynard R. Wilbur
Assistant Examiner—G. E. Montone
Attorney, Agent, or Firm—R. S. Sciascia; J. W. Pease; H. A. David

[57] ABSTRACT

Part of the output of an active signal generator is delayed, phase shifted and recombined with the remainder of the output to form an input to an echo generator. Part of the output of a passive signal generator is likewise delayed, phase shifted and recombined with the passive signal generator output prior to being combined with the output of the echo synthesizer to provide signals simulative of multipath sonar characteristics. A controllable delay network utilizing shift register means is disclosed.

7 Claims, 2 Drawing Figures

INVENTOR
FRANCIS J. MURPHREE

INVENTOR
FRANCIS J. MURPHREE
BY Harvey A. David
John M. Pease
ATTORNEYS

3,789,128

MULTIPATH SONAR SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonar simulation and more particularly to apparatus for generating signals simulative of active or passive sound signals arriving at a receiver via a plurality of paths from a target.

One major effect of multi-path transmission is to cause fluctuations in the amplitude of each frequency component of a multi-frequency signal as the separation between source and receiver changes, because of the changing phase relation between direct and delayed components of each signal. The phase shift between two signals arriving at a given point with a difference of transmission time $\Delta t$ is $2\pi f \Delta t$, where $f$ is the frequency of the sonar signal. If $2\pi f \Delta t$ is an odd multiple of $\pi$ (and no phase shift occurs at the reflecting surface) the sum of the delayed and direct signals is a minimum. The opposite is true if $2\pi f \Delta t = 0$ or is an even multiple of $\pi$. Signals of differing frequency will usually be of unequal amplitude at the receiving point, even though their source amplitudes may have been the same, because $2\pi f \Delta t$ depends on frequency. This complicates the simulation problem if the source contains many components. In the case of active sonar, multipath "stretches" the echo and may obscure information that would otherwise be apparent.

The magntiude of $\Delta t$ depends upon the geometry of the multipath situation. A typical case exists where a signal originating at a source travels to a receiver via a direct path and also via a surface reflected path. In this case $$\Delta t = 2\, d\, d^1/r\, v, \qquad (1)$$

where $d$ is the depth of the source, $d^1$ the depth of the receiver, $r$ is the horizontal separation (range) between source and receiver and $v$ is the velocity of sound in water. (This relation is derived in "Underwater Acoustic Handbook" by Vernon M. Albers, Vol. II, page 50).

If the siganl originating at the source is reflected back by the target, then the delay between the echo that travels forth and back by the direct path and the echo which travels in both directions by the surface reflected path is $2\Delta t$. Two additional pairs of paths are possible, namely that which is direct going from source to target and is reflected going from target to receiver, and that which is reflected during travel from source to target and is direct going from target to receiver. Not all paths will necessarily be effective in any given case. The relative delay of the longer path compared to the direct path is $\Delta t$ for both cases. As stated above, the phase difference between a direct path and a multipath signal (or any pair of paths of different length) signal due to a delay $\Delta t$ is $2\pi f \Delta t$. The total phase difference must include the phase shift occuring at reflection.

In past or proposed devices the effects of multipath have been roughly approximated by introducing random fluctuations into the amplitude of the simulated signal. In laboratory experiments the effect of multipath has been approximated by the use of fixed delay lines. In the training-simulation field the problem has not received widespread attention probably because of the extensive use of magnetic recordings for training purposes. Recordings made of actual signals of cource contain all of the effects one has to otherwise simulate.

Unfortunately the use of taped actual signals limits the simultion to the circumstances of the recording and does not permit changes in the program as may be desired for simulation of varying tactical situations and the like. Moreover, the large bandwidth which is required to be recorded to render simulation of the barrel stave type sonar system has required use of very high speed recorder/reproducers which have experienced in inordinately high breakdown rate.

DESCRIPTION OF THE PREFERRED EMBODIMENT

Figure 1:
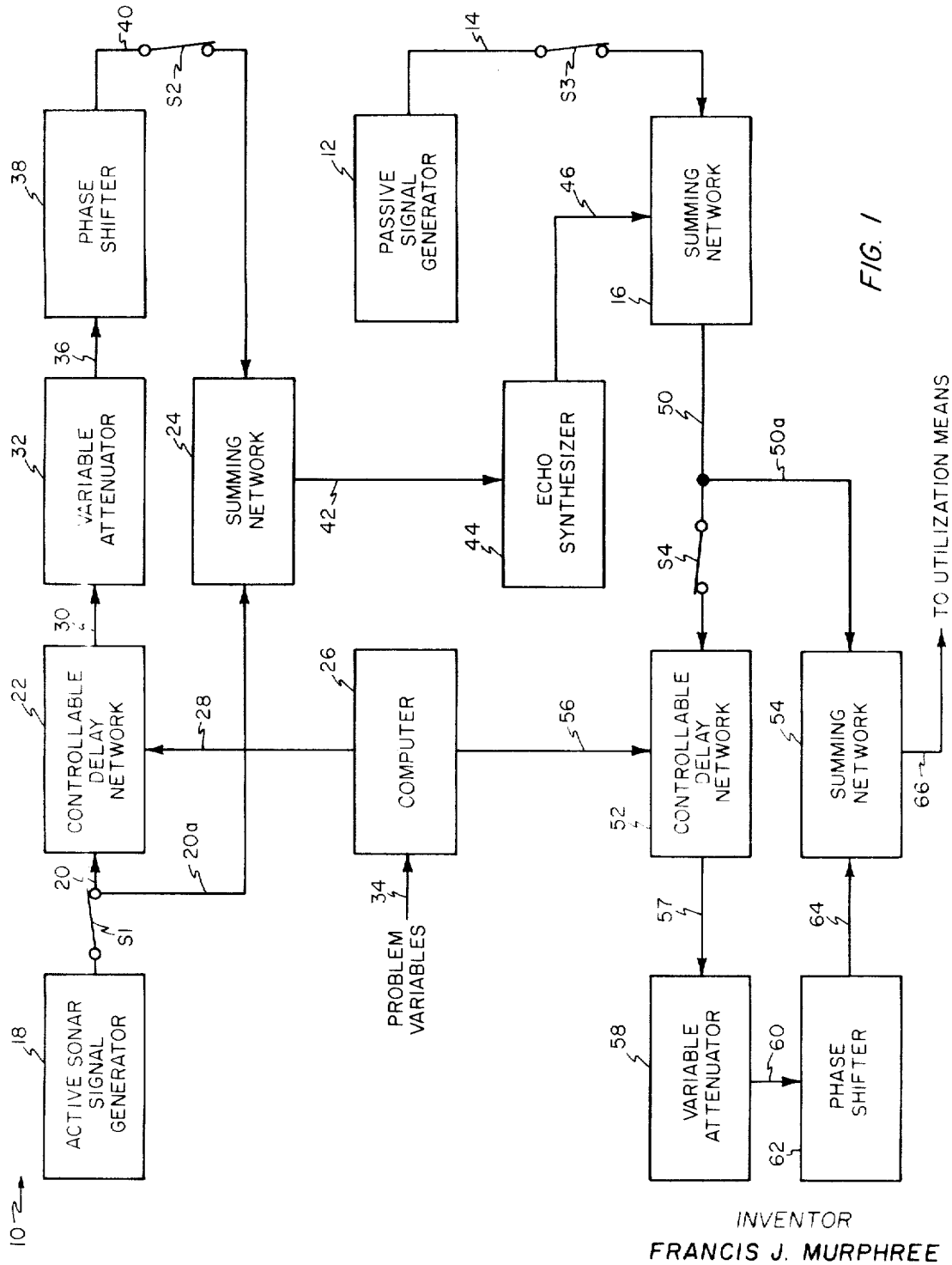
FIG. 1 is a diagrammatic illustration, in block form, of a multipath sonar simulator embodying the invention.

In the form of the invention illustrated in FIG. 1 and described hereinafter, a multipath simulator 10 comprises a passive signal generator 12 the output of which, represented by flow line 14, may include signals simulative of those which might emanate from a target, e.g. propellor beat, machinery noise, etc. Such generators are well known by those skilled in the art to which the invention pertains and need not be described in detail. The passive signal output 14 is connected as one input to a summing network 16.

A second input to the summing network 16 is derived from an active sonar signal generator 18 which may conveniently generate a signal simulative of CW sonar ping, F.M. slide, or whatever character sonar is desired. The active sonar signal generator may in some cases be an operational sonar apparatus but may also be apparatus such as those well known in the simulation art for generating electrical signals simulative of active sonar active pings. The output of the active sonar generator 18 is applied as shown by line 20 to a controllable delay network 22, and by line 20a to a summing network 24.

Figure 2:
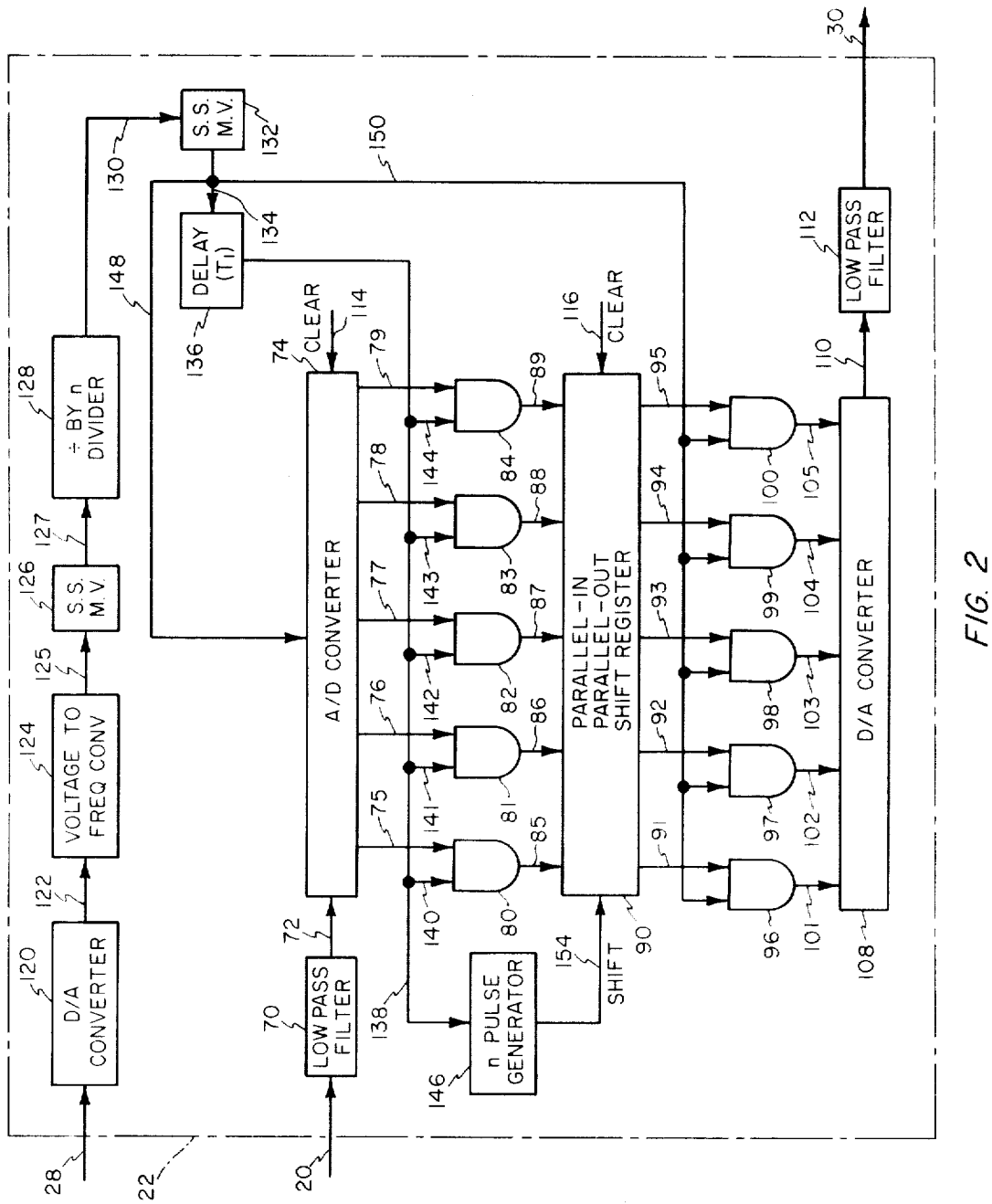
FIG. 2 is a diagrammatic illustration, in block form and in greater detail, of a controllable delay network forming part of the simulator of FIG. 1.

The controllable delay network 22, which will later be described in more detail with reference to FIG. 2, is responsive to a delay command signal received from a computer 26 via line 28, to provide a delayed active sonar signal on line 30 to a variable attenuator 32.

The delay introduced by the network 22 represents the time for a sonar signal to travel from a sonar source to a target by a reflective path, for example by surface reflection or by reflection off of a thermal boundary. The computer 26 provides appropriate delay commands on line 28 in accordance with problem variables such as the depth of the sonar source, the depth of the target, and target range, all of which problem variables are represented collectively by line 34.

The delayed active sonar signal is suitably attenuated by attenuator 32 and passed as shown by line 36 to a phase shifter 38. The phase shifter 38 introduces a change of phase corresponding to that which occurs in operational sonar signals upon reflection from a surface, and passes the phase shifted signal as shown by line 40 to the summing network 24.

The summing network 24 combines the direct path active sonar signal received via line 20a with the reflected path active signal received via line 40 to provide a composite active sonar signal, represented by line 42, to an echo synthesizer 44. This composite signal on line 42 may be considered to be the total target illuminating signal.

The echo synthesizer 44, which is desirably of the character described in copending patent application Ser. No. 94,134, filed Dec. 1, 1970, provides electrical signals on line 46 simulative of aspect dependent, highlighted sonar echoes. These active sonar signal echoes are applied via line 46 as a second input to the summing network 16 where they are combined with passive sonar signals from the passive signal generator 12 to provide on line 50 a composite of all signals leaving the target whether active or passive. The composite signals are applied via line 50 to a controllable delay network 52 and via line 50a to a summing network 54.

The controllable delay network 52 may be a duplicate of the network 22 and introduces, in response to delay commands via line 56 from the computer 26, a delay which represents the amount by which the time required for signals to arrive at the sonar receiver by a reflective path exceeds the time required for signals to arrive from the target by a direct path. The dealyed composite echo and passive signals are applied as shown by line 57 to a variable attenuator 58 which attenuates the signals and passes them by line 60 to a phase shifter 62. The phase shifter 62 introduces a phase change simulative of that which occurs in an actual reflective path and passes the phase changed signal via line 64 as one input to the summing network 54. The other input to the summing network 54 is the output of the summing network 16 via lines 50, 50a and represents signals traveling to the sonar receiver from the target along a direct path.

The summing network 54 combines the reflected path signals from phase shifter 62 with the direct path signals from the summing network 16 to provide an output on line 66 which is fully simulative of sonar reception involving both active and passive signals and involving both direct and indirect transmission paths to and from the target.

At times it may be desirable in rendering realistic training to eliminate one or the other, or both, of the reflective paths, or to eliminate either active or passive signals. To this end, switches S1, S2, S3, and S4 are included in lines 14, 20, 40, and 50, respectively. These switches may be used in various combinations to provide the desired degree of simulation.

Referring now to FIG. 2, there is illustrated in more detail the preferred form of controllable delay network 22 which achieves a variable time delay through the agency of what may be termed a shift register delay line. The network 22 comprises a low pass input filter 70 connected to pass its output as shown by line 72 to the input of an $n$ bit analog to digital converter 74 having parallel output lines 74 – 79, $n$ being taken as five for purposes of illustration. This converter 74 serves, when actuated by a suitable read signal, to read out digitally the amplitude of the input thereto from filter 70. The output lines 75 –79 are connected as inputs to AND gates 80 – 84, respectively, the output lines 85 – 89 of which are connected as the inputs to an $n$ channel parallel-in/parallel-out shift register 90.

The shift register 90 has its parallel output lines 91 – 95 connected as inputs to AND gates 96 – 100, respectively, the output lines 101 – 105 of which are connected as inputs to a digital to analog converter 108. The converter 108 has its output connected as shown by line 110 to a low pass output filter 112, the output of which is on line 30.

Provision is made, according to the usual practice with shift registers and digital to analog converters, to initially clear the converter 74 and the register 90. This is represented by lines 114 and 116, respectively.

Actuating of the converter 74, enabling of the AND gates 80 – 84, shifting of the register 90, and enabling of the AND gates 96 – 100 are effected by timing means which derive the necessary gating and shift signals from the output of the computer 26 on line 28, which output has been described as the reciprocal of the time differential between the direct and the reflected paths, i.e. $1/\Delta t$. The timing means comprises a digital to analog converter 120 which receives the input via line 28. The output of converter 120 is an analog voltage represented by line 122 connected as the controlling input to a voltage to frequency converter 124 which may be in the form of a voltage controlled oscillator.

The sine wave output of converter 124 on line 125 is shaped to series of pulses of predetermined width by a singleshot multivibrator 126 and applied as shown by line 127 to a divide by $n$ divider 128. The output of the divider 128 on line 130 is shaped to a series of pulses of predetermined width by a singleshot multivibrator 132 and passed via line 134, a fixed delay means 136 and lines 138 and 140 – 144 to AND gate 80 – 84, and also to an $n$ pulse generator 146. The output of the divider 128 and singleshot multivibrator 132 is also applied via line 148 as the read signal to the converter 74, and via line 150 as the enabling signals for the AND gates 96 – 100, all as more fully exlained hereinafter.

The delay to which the signal is subjected in passing through the shift register 90 is inversely proportional to the shift rate and directly proportional to the number of stages. The shift register delay is made equal to the desired multipath delay $\Delta t$ by controlling the shift rate and number of stages as follows:

Assume that the digital computer 26 has solved for the multipath delay $\Delta t$ corresponding to a particular set of variables at a particular time and applies the reciprocal of this number to the D/A converter 120. The smaller the number $\Delta t$, the larger will be the D.C. voltage output of the converter 120. The voltage to frequency converter 124 provides a frequency determined by the voltage on line 122 and is used to shift the register 90 and to control the signal sampling rate. By proper choice of parameters this approach gives the desired results.

Now, let $m$ = number of shift register 90 stages required to generate a certain delay $\Delta t$. Then $m = \Delta t$ times the shift rate. If a delay of 0.01 seconds is desired and the shift rate is 15000 Hz, then $m = 0.01 = 15000$ = 150 stages. The shift rate is to be related to the rate at which the signal is sampled prior to A/D conversion. The minimum sampling rate $\cong 3f_{s\ max}$ where $f_{s\ max}$ is the maximum signal frequency. Let the minimum shift rate $\cong 3f_{s\,max}\, n$, where $n$ is the number of bits used to define each sample.

Note that the sampling rate can be as much greater than the minimum value $3f_{s\,max}$ as desired.

Call the shift rate $F_s$. Then, $$F_s = m/\Delta t, \qquad (2)$$
$$F_{s\,min} = 3f_{s\,max}\, n = m/\Delta t_{max}, \text{ and} \qquad (3)$$
$$m = 3f_{s\,max}\, n\, \Delta t_{max}. \qquad (4)$$

Where $\Delta t_{max}$ is the maximum delay to be provided, and given $$F_s = m/\Delta t, \text{ then} \qquad (2)$$
$$F_s = 3f_{s\,max}\, n\, (\Delta t_{max}/\Delta t). \qquad (5)$$

Let the shift rate $F_s = Va$, where $V$ is a DC voltage and $a$ is a constant expressed in Hertz per volt. Then from the previous results, $$Va = m/\Delta t; \text{ or} \qquad (6)$$
$$V = m/a\Delta t. \qquad (7)$$

Thus, if
$a = 10,000$ Hertz per volt,
$m = 150$
$t = .001$ sec, then
$V = 150/10,000 \times .001$
$= 15$
$=$ DC volts applied to voltage to frequency converter
$F_s = Va$
$= 15 \times 10,000$
$= 15,000$ Hz The sampling rate = shift rate/$n$ = 150,000/5 = 30,000 Hz.

For the simple geometry set forth in the preceding Background of the Invention $\Delta t$ need not be calculated directly in order to find $V$. Thus, the substitution of the value of $\Delta t$ from Equation 1 into Equation 7, $$V = m/(2\, dd^1/rv) = r\, (mv/2dd^1 a) \qquad (8)$$

The last states that, for a given value of $a$ and constant $dd^1$ product, the voltage $V$ to be applied to the voltage to frequency converter is directly proportional to the range $r$.

Keeping the above results in mind, further operation of FIG. 2 is as follows:

The output frequency $F_s$ of the voltage to frequency converter 124 is $3f_{s\,max}\, n\, (\Delta t_{max}/\Delta t)$ as discussed previously. A sample of $F_s$ is fed via line 127 to divide by $n$ divider 128, the multivibrator shaped output of which is fed to the fixed delay 136. The output from the delay 136 is fed to one input of AND gates 80 – 94 and to the n-pulse generator 146. One component of the divide by $n$ circuit 128 is also fed via line 148 as a read command to the A/D converter 74. When this occurs the converter 74 changes the analog input amplitude to a $n$ bit digital word in less than $T_1$ seconds, the time delay of the fixed delay 136. At the end of $T_1$ seconds the delayed signal from 136 is applied to the AND gates 80 – 84 transferring the contents of the A/D converter to the shift register 90. The $n$ pulse generator 146 is triggered by the trailing edge of the delayed pulse from delay 136 to generate on line 154 a string of $n$ pulses which shift the register 90 $n$ places. In the meantime, the A/D converter read signal has, by virtue of line 150, enabled AND gates 96 – 100 so as to read out the contents of the shift register 90 to the D/A converter 108. After $n$ pulses, during which a different delayed word sample is set up for readout and a new sample for read in, the above sequence is repeated. Because of the use of the n -pulse generator triggered by the trailing edge of the delayed signal from delay 136 to generate shift pulses, instead of using the undivided output of the voltage to frequency converter 124 to effect shifting, the A/D conversion in converter 74, and the shift of the digital information into and out of the register 90 can take $n$ times as long.

The foregoing assumes that the computer output $1/\Delta t$ on line 28 is digital. If the computer 26 is analog in character and provides $1/\Delta t$ in terms of a voltage, then the D/A converter 120 can be omitted and the computer output applied directly to the voltage to frequency converter 124.

Obviously many modifications and variations of the present invention are possible in the light of the above teachings. It is therefore to be understood that within the scope of the appended claims the invention may be practiced otherwise than as specifically described.

What is claimed is:

1. Apparatus for generating electrical signals simulative of active and passive sonar signals arriving at a receiver via a plurality of paths, said apparatus comprising:

a source (18) of active sonar simulating electrical signals;

a source (12) of passive sonar simulating electrical signals;

a first controllable delay network (22) connected to receive said active signals and introduce a first delay;

a first phase shifter (38) connected to receive the output of said first delay network and introduce a first phase shift;

a first summing network (24) connected to combine said active signals with the delayed and phase shifted output of said first phase shifter to provide simulated target illuminating signals;

an echo synthesizer (44) connected to receive said target illuminating signals and operative to generate echo signals therefrom;

a second summing network (16) operative to combine said echo signals with said passive signals;

a second controllable delay network (52) connected to receive the output of said second summing network and operative to introduce a second delay;

a second phase shifter (62) connected to receive the output of said second delay network and operative to introduce a second phase shift;

a third summing network 54 connected to receive and combine the outputs of said second summing network and said second phase shifter to produce the desired simulative multipath signals.

2. Apparatus as defined in claim 1, and further comprising:

a first variable attenuator means (32) connected to selectively vary the amplitude of delayed and phase shifted active signals; and a second variable attenuator means (58) connected to selectively vary the amplitude of the delayed and phase shifted synthesizer and passive source signals.

3. Apparatus as defined in claim 1, and comprising: switch means (S1, S2, S3, S4) for selectively changing simulated path combinations.

4. Apparatus as defined in claim 1 and further comprising:
   computer means (26) responsive to problem variables for providing delay control signals; and
   said first and second controllable delay network being responsive to said control signals to effect said first and second delays consistent with said problem variables.

5. Apparatus as defined in claim 4 and wherein said first and second controllable delay networks each comprise:
   $n$ bit analog to digital converter means (74) for converting said sonar simulating signals from a characteristic frequency to $n$ parallel digital signals;
   an $n$ channel, parallel-in, parallel-out shift register (90);
   first gate means (80 – 84) connecting the output of said analog to digital converter means to the input of said shift register;
   an $n$ bit digital to analog converter (108);
   second gate means (96 – 100) connecting the output of said shift register to the input of said digital to analog converter; and
   control means responsive to said control signals and operative to enable said first and second gate means and to drive said shift register at a shift rate which will produce a delay consistent with said problem variables.

6. Apparatus as defined in claim 5, and wherein said control means comprises:
   a voltage to frequency converter (124) operative to provide a frequency proportional to said delay control signals in response to an analog voltage input;
   a divide by $n$ divider (128) connected to divide the output frequency of said voltage to frequency converter to provide read signals to said analog to digital converter (74);
   a first fixed delay means (136) connected between said output of said divider and said first gate means and providing delayed pulses so as to enable said first gate means after a first predetermined delay;
   a $n$ pulse generator connected to said first fixed delay means and triggered by the trailing edge of each of the delayed pulses from said first fixed delay means to generate as an output a string of $n$ pulses, the output of said $n$ pulse generator being connected to the shift input of said shift register; and
   said second gate means being enabled upon occurrence of said read signals to read out said shift register to said digital to analog converter (108).

7. Apparatus as defined in claim 6, and:
   said computer means (26) providing a digital output; and
   said control means comprising a digital to analog converter (120) for providing said analog voltage input to said voltage to frequency converter.

* * * * *